MULTIPLE-CHANNEL MAGNETIC RECORDER

Filed June 6, 1952 3 Sheets-Sheet 1

INVENTOR.
JAMES M. CUNNINGHAM
BY Elwood E Kendrick
Attorney

MULTIPLE-CHANNEL MAGNETIC RECORDER

Filed June 6, 1952 3 Sheets-Sheet 2

INVENTOR.
JAMES M. CUNNINGHAM
BY Elwood [illegible] Kendrick
Attorney

Sept. 17, 1957 J. M. CUNNINGHAM 2,806,757

MULTIPLE-CHANNEL MAGNETIC RECORDER

Filed June 6, 1952 3 Sheets-Sheet 3

INVENTOR.
JAMES M. CUNNINGHAM
BY Elwood L. Kendrick
Attorney

United States Patent Office 2,806,757

Patented Sept. 17, 1957

2,806,757

MULTIPLE-CHANNEL MAGNETIC RECORDER

James M. Cunningham, Los Angeles, Calif., assignor to E. R. Chilcott and Doris C. Chilcott, a copartnership, doing business as Techno Instrument Company, Los Angeles, Calif.

Application June 6, 1952, Serial No. 292,104

20 Claims. (Cl. 346—74)

This invention relates to devices for recording vibration and similar wave phenomena with special reference to shock waves and sonic waves as well as super-sonic waves in various media including the air, earth and physical bodies. The invention is specifically directed to a multiple-channel recorder for making a plurality of synchronous records from a plurality of sources on a single recording medium.

The general object of the invention is to provide a compact multiple-channel magnetic recorder capable of producing a relatively large number of simultaneous recordings on a single recording medium, which recorder is constructed with quickly detachable interchangeable parts and sub-assemblies.

The invention is broadly applicable to various purposes involving multiple simultaneous recording. For example, the invention may be used to record vibrations simultaneously at multiple points of a structure under test observation, for example, the structure of an aircraft. The invention has special utility, however, in its initial embodiment as a multiple-channel magnetic recorder for geophysical exploration procedures wherein the seismic waves created by an explosion are recorded at multiple points for subsequent study and analysis. Such a practice of the invention will be described herein for the purpose of disclosure since the example will provide adequate guidance for those skilled in the art who may have occasion to apply the same principles to other specific purposes.

With reference to this illustrative practice of the invention it is notable that heretofore simultaneous recording of seismic waves as well as the simultaneous recording of vibration at various points in physical structures has been accomplished almost entirely by oscillographic instruments either of the direct writing type or of the photographic type.

Direct writing oscillographs have the advantage of producing a record that can be immediately inspected on the spot. The disadvantages of direct writing oscillographs, however, include deficiency in frequency response, the necessary dependence on a large number of moving parts in the recording procedure, and the fact that the record is not suitable for subsequent analysis by electronic methods.

The photographic type of oscillograph has more ample frequency response and has the important advantage of producing a record that can be reproduced or rerun for analysis by electronic procdures. One serious disadvantage of the photographic type, however, is the time delay involved in photographic procedures for developing the latent image record. Another disadvantage is the vulnerability of the record to spoilage by accidental exposure to light prior to completion of the development procedure. Any attempt to reduce or minimize the time delay by immediate development of the film in the field involves numerous problems in the design of traveling photographic equipment usually resulting in excessively bulky field apparatus. It is also to be noted that photographic development in the field requires additional skill on the part of the field personnel.

The general object of the present embodiment of the invention is to provide a multiple-channel recorder having all the advantages of the prior art oscillographic devices as well as important additional advantages, but having practically none of the disadvantages.

One object of the invention is to provide a simultaneous recording device having many more channels than heretofore feasible and providing a single one-piece recording medium having more concurrent record tracks thereon than heretofore afforded in the art. In this regard a special feature of the preferred practice of the invention is the flexibility of construction in the special sense that the apparatus may be expanded with respect to the number of concurrent channels to meet the requirements of nearly any conceivable test procedure. For example, an apparatus initially equipped to produce ten or eleven simultaneous recordings on a single recording medium for a given specific purpose may be easily expanded by virtue of built-in provisions to produce as many as forty or more simultaneous record tracks on the same sheet if such a large number of channels is required for some new specific purpose. It is a striking fact that no oscillographic recording apparatus heretofore used in the field of seismic exploration or even in the field of aircraft testing can approach this number of simultaneous recordings on a single record medium.

The contemplated recording procedure provides a multiple-track record that may be immediately reproduced for a quick check. The record is permanent, substantially noninflammable, not easily damaged, may be stored indefinitely without deterioration, and may be re-run an exceedingly large number of times without significant wear effect. The record is a faithful reproduction of the wave forms and may be run through an electronic analyzer and may be re-run with various electronic filters for selective isolation of different significant aspects of the wave forms.

A further object of the invention is to provide a compact relatively light apparatus of simple construction that is eminently suited for field use and is designed for quick correction of any failure among its constituent parts. This object is attained in part by certain features pertaining to compactness as well as simplicity of structure and in part by using component parts and sub-assemblies designed for quick replacement. Thus the need for skill in repairing electronic devices and need for elaborate test and repair facilities in the field are circumvented by convenient resort to spare parts. It is a simple matter to correct failure in any one of the recording channels by replacement of an interchangeable magnetic head assembly or replacement of a complete interchangeable amplifier unit without taking time and trouble to ascertain the nature and cause of the failure.

An important object of the invention is to meet the problem of compactness with reference to the necessity of crowding together a large number of concurrent individual record tracks on a single recording medium. For synchronous concurrent recording, the magnetic heads must be positioned side by side in a row across the path of the traveling medium and therefore the magnetic heads not only must be relatively thin in lateral dimension but also must be closely spaced to produce as many as 44 or more record tracks on a recording medium of practical dimensions. This problem is met by magnetic heads of special design and, as will be explained, by carefully designed supporting structure for the magnetic heads. In this regard the invention is characterized by the use of replaceable blade-like holders with the individual heads detachable and adjustably mounted on the individual holders.

In the preferred practice of the invention the blades are arranged edgewise in a row across the path of the recording medium and the magnetic heads are positioned in a row between the row of blades and the recording medium. Compactness is further attained by placing the row of blades relatively close to the traveling medium and suitably recessing the blades to provide space for the row of magnetic heads.

A still further object of the preferred practice of the invention is to provide a multiple-channel recorder adapted for what may be called phase adjustment of the individual record tracks. In seismic recording the waves generated at a single source point necessarily travel different distances to reach scattered points of detection and the disparity among the distances of wave travel through the earth may be especially large in uneven terrain. Such phase synchronization may be achieved by accurately shifting the individual magnetic heads of the recording apparatus forward or rearward with respect to the direction of travel of the recording medium. A feature of the invention is the provision of suitable index means calibrated for guidance in the phase adjustments of the individual magnetic heads.

In the preferred practice of the invention the path of travel of the recording medium through the recording zone is circular and therefore the paths of adjustment movement of the individual magnetic heads must conform accurately to the circular path of travel. Moreover, the close spacing of the magnetic heads requires close control of the lateral positioning of the heads and therefore the adjustment paths must not deviate laterally to any appreciable extent. In this regard a feature of the preferred practice of the invention is the concept of using curved holders in the form of blades that are curved edgewise and are slideably mounted edgewise in corresponding slots having curved bottom surfaces for the blade edges, the curvatures of the blades being accurately concentric to the curvature of the path of travel of the recorded medium. The concept further includes the use of yielding means for maintaining the holders in accurate position in the slots, as will be explained.

In the preferred embodiment of the invention the recording medium is in the form of a relatively wide flexible sheet that is fixedly mounted on the periphery of a cylinder or rotary drum to be moved through the recording zone by rotation of the drum. It is a further object of the invention to provide convenient, efficient and time-saving means for releasably mounting the recording sheet on the drum with the sheet in uniform tension. As will be explained, this object is attained by using a recording sheet with longitudinal slots in its two end margins positioned to overlap when the sheet is placed around the drum. Suitable expansible sheet-engaging means enter the pairs of overlapping slots and expand in the slots to place the sheet under tension at multiple spaced points.

The above and other objects and advantages of the invention will be understood from the following detailed description considered with the accompanying drawings.

In the drawings, which are to be regarded as merely illustrative,

*General arrangement*

Figures 1, 2:
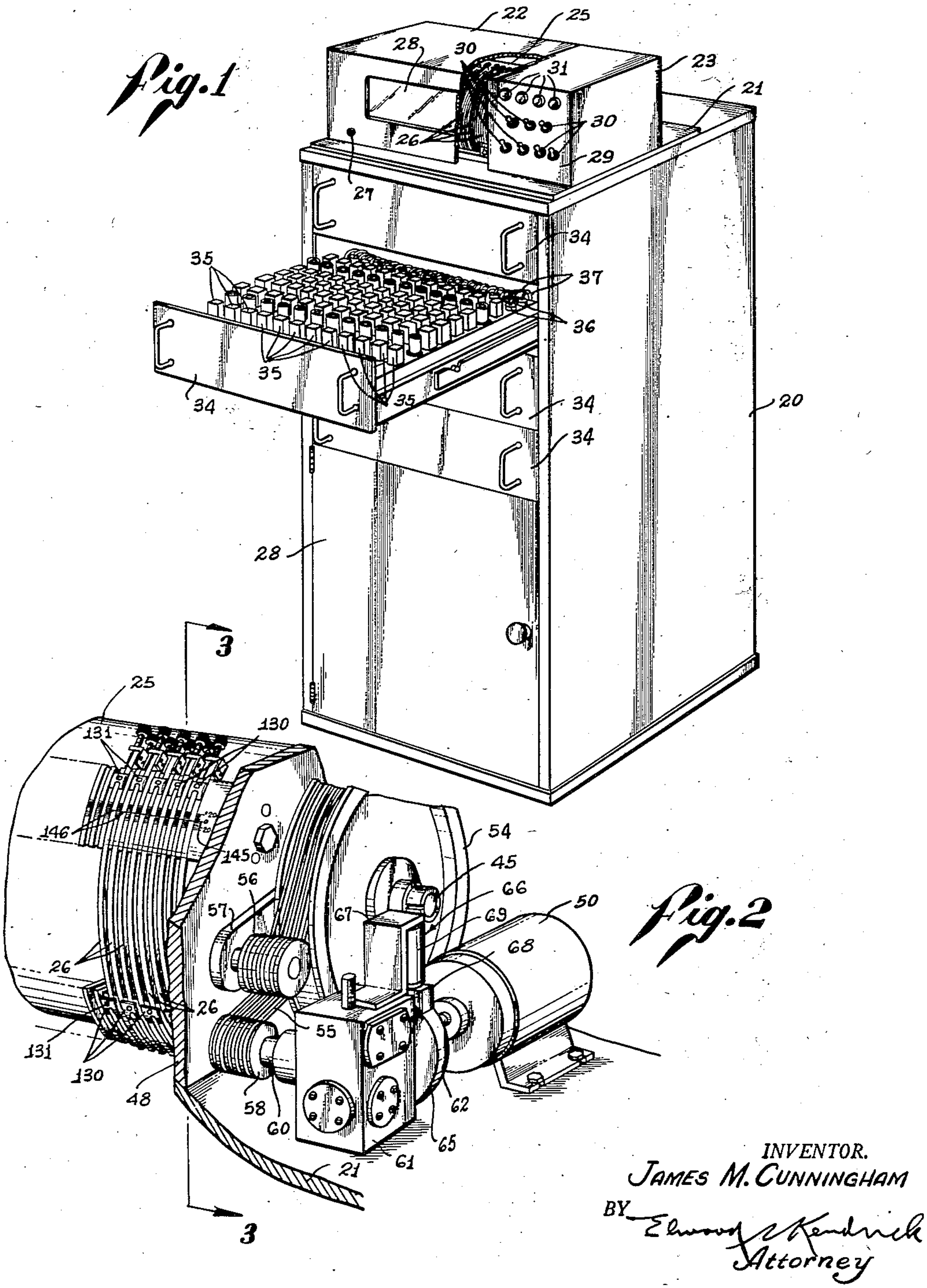
Fig. 1 is a perspective view of the preferred embodiment of the invention.
Fig. 2 is a perspective view on a larger scale of a fragment of the apparatus including the rotary drum and the plurality of holders for the magnetic heads.

The specific embodiment of the invention selected by way of illustration is a multiple channel, magnetic recorder-reproducer, designed primarily for field service in making seismic recordings for geographical exploration. The apparatus may be in the form shown in Fig. 1, which comprises a suitable cabinet 20 on the top of which is a suitable base plate 21 to support the mechanical or moving parts of the apparatus. The mechanism mounted on the base plate 21 is enclosed by two housings 22 and 23.

Housing 22 encloses a rotary drum or cylinder 25 (Fig. 2) that is actuated to guide a suitable recording medium in the form of a flexible sheet in a curved path of travel past a recording zone. A bank or row of holders 26 for supporting magnetic heads in this zone is positioned relatively close to the periphery of the rotary drum, there being one holder 26 for each channel. In this preferred practice of the invention, the holders 26 are thin bars or blade-like members mounted edgewise with respect to the drum 25 and as many as forty-four such holders may be employed for simultaneously recording as many tracks on the magnetic sheet medium. Usually one of the tracks will be used for a timing record.

Preferably the housing 22 for the rotary drum 25 is in the form of a boxlike cover that is hingedly mounted at its rear on the base plate 21 so that the cover may be swung upward and rearward to an open position for maximum access to the rotary drum. Normally the housing or cover will be held in closed position by releasable fasteners 27 for the protection of the enclosed working parts as shown in Fig. 1. Preferably a window 28 of suitable flexible transparent plastic material is provided for observation of the drum when the cover is closed. The second housing 23 encloses suitable motor means for actuating the rotary drum 25 and a portion of the outer wall of the housing serves as a panel 29 on which various control switches 30 and indicator lamps 31 are mounted for use in the operation of the apparatus.

The cabinet 20 shown in Fig. 1 has four upper drawers 34 of freely slideable construction, the purpose of which is to hold pluralities of recorder-reproducer amplifier units 35. Since there are 44 channels, each of the drawers 34 holds a minimum of eleven amplifier units 35. Each recorder-reproducer amplifier unit 35 is preferably in the form of a self-contained plug-in unit complete with switching provisions and power supply filtering. It is contemplated that any number of channels from 1 to 43 may be switched from a single master switch at a location remote from the apparatus.

Each of the amplifier units 35 may be relatively compact, the units in the initial embodiment of the invention being approximately an inch and a half wide, four inches high and fifteen inches long. At the rear end of each of the amplifier units is a pair of releasable connectors 36 for a pair of cables 37 by means of which individual units may be either electrically connected with the equipment or disconnected in minimum time.

The lower part of the cabinet 20 which is closed by a door 28 encloses the remaining components of the apparatus including various sources of electric current not included in the novelty of the present invention.

*Rotary drum and driving mechanism*

Figure 9:
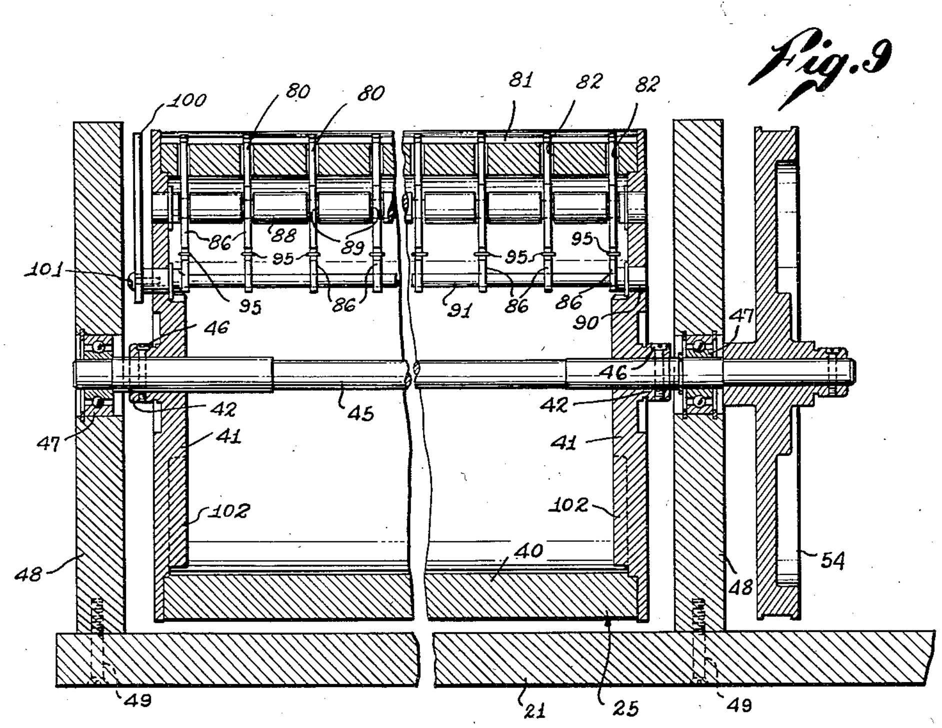
Fig. 9 is a section taken along the axis of the drum as indicated by the line 9—9 of Fig. 3.

As best shown in Fig. 9 the rotary drum 25 comprises a cylindrical wall 40 supported by two circular end walls 41, each of the end walls having a hub portion 42. A suitable shaft 45 extending through the hub portions 42 and attached thereto by suitable screws 46 is journaled in suitable anti-friction bearings 47. The bearings 47 are mounted in a pair of vertical support plates 48 that are suitably attached to the base plate 21 by screws 49.

The rotary drum 25 may be actuated in any suitable manner, for example, by a synchronous motor 50 (Fig. 2) in the motor housing 23. For this purpose the shaft 45 extends into the motor housing and carries a relatively large pulley 54 adapted to be actuated by an endless string belt 55. The string belt 55, which is maintained taut by an idler pulley 56 on a spring loaded arm 57, is actuated by a drive pulley 58. The drive pulley 58 is on a drive shaft 60, driven by suitable reducing gearing (not shown) in a gear case 61. The motor 50 is connected with the gearing by a motor shaft 62 that carries a suitable flywheel 65.

Preferably suitable braking means is included to stop the rotary drum 25 immediately upon de-energization of the motor 50. The particular magnetic brake shown by way of example in Fig. 2 and generally designated 66 is mounted on a suitable bracket 67 and includes a brakeshoe 68. The brakeshoe 68 is normally pressed against the flywheel 65 by a concealed spring but may be retracted by energization of a solenoid 69. It is contemplated that the solenoid will be in the same circuit as the motor 50 so that the brakeshoe 68 will be automatically retracted whenever the motor is energized and will automatically engage the flywheel immediately upon de-energization of the motor.

The function of the rotary drum 25 is to move a recording medium in a circular path. While any suitable recording medium may be employed, the presently preferred medium is a powder-coated plastic sheet of the same construction as conventional magnetic tape. For a relatively long recording or reproducing period the rotary drum 25 may serve as a drive roller to drive the sheet medium in the manner of a belt. For the present purpose of geophysical exploration, however, the rotary drum 25 may be employed as a sheet-holding means as well as a sheet-guiding means since the maximum recording period required for seismic wave recording in geophysical exploration is less than 6 seconds and here a drum 7½ inches in diameter recording at a peripheral speed of 3½ inches per second will make less than one complete revolution in 6 seconds. In the present preferred practice of the invention, the recording medium is in the form of a powder-coated plastic sheet 11¾ inches wide by 24¼ inches long which is wrapped lengthwise around the drum and is releasably attached thereto.

*Sheet-attachment means*

While the recording sheet may be releasably mounted on the rotary drum 25 by various expedients, a feature of the presently described preferred embodiment of the invention is the concept of employing recording sheets having suitable apertures in their two end portions with suitable sheet-engaging means built into the construction of the rotary drum 25 for cooperation with the sheet apertures. It is contemplated that the apertures at each end of a sheet will overlap on the rotary drum 25 in such manner that the sheet-engaging means may extend through the overlapping apertures and expand against the edges of the apertures thereby to place the sheet under longitudinal tension at a plurality of points.

Figure 7:
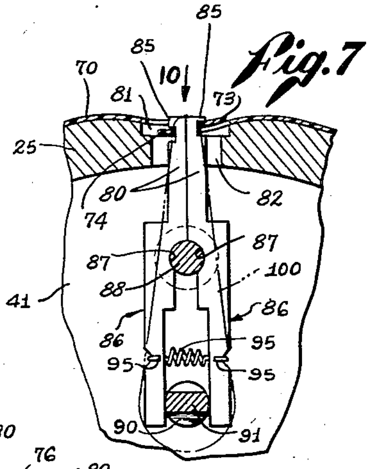
Fig. 7 is a fragmentary sectional view showing one of the sheet engaging means in its release position.
Figure 8:
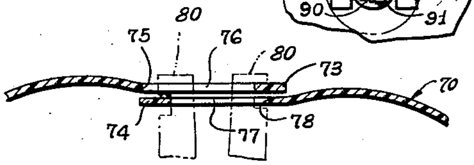
Fig. 8 is an enlarged detail of Fig. 3 with the sheet engaging means shown in dotted lines.
Figure 12:
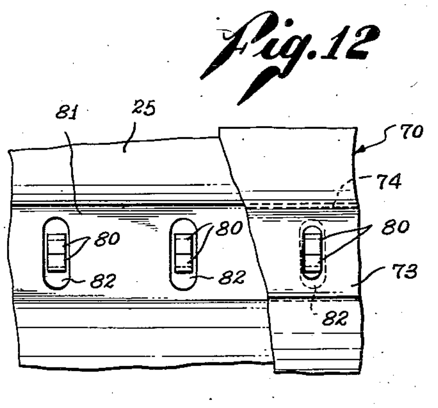
Fig. 12 is a fragmentary view of the periphery of the drum showing the sheet engaging means extending through the wall of the drum.

This method of releasably securing a flexible recording sheet around a drum may be understood in principle by referring to Figs. 7, 8 and 12. A flexible recording sheet generally designated 70 is wrapped on the periphery of the rotary drum 25 with one end portion 73 of the sheet overlapping the second end portion 74. These two end portions 73 and 74 of the sheet 70 have pluralities of slots which match so that major portions of the pairs of slots overlap. It is important to note that only the outer end portions of the swo slots overlap in the final position of the sheet 70. Thus in Fig. 8 showing the overlapping ends 73 and 74 in their final positions, the outer end or edge 75 of a slot 76 in the end portion 73 overlies the corresponding slot 77 in the other end portion 74 and the outer end or edge of the lower slot 77 underlies the upper slot 70. The other ends of the two slots are not in overlapping relationships. Thus a suitable means extending into the two slots and expanded longitudinally of the slots will engage the end portions 73 and 74 of the two slots to place the sheet under tension without interference by the inner ends of the slots.

Any suitable sheet-engaging means may be employed for this purpose in each pair of slots but preferably such means comprises a pair of movable fingers 80 shown in dotted lines in Fig. 8. It will be noted in Fig. 8, where the two fingers 80 are spread apart to place the sheet 70 under tension, one finger abuts the outer end portion 75 of the upper slot 76 and the other finger abuts the outer end 78 of the lower slot 77.

A further feature of the preferred practice of the invention is the fact that the sheet-engaging fingers 80 lie wholly within the outer circumference of the sheet-wrapped drum so that the sheet-engaging fingers may be out of range of magnetic heads that are positioned adjacent the drum to contact the outer surface of the wrapped sheet. To provide this feature the cylindrical wall 40 of the rotary drum 25 has a suitable longitudinal groove or recess 81 to receive the overlapping sheet ends 73 and 74 and is further provided with a plurality of longitudinal slots 82 arranged in a row along the groove 81. The sheet-engaging fingers 80 extend out through the drum slots 82 but terminate short of the circumference defined by a sheet on the drum.

In the preferred construction of the invention the sheet-engaging fingers 80 are notched or otherwise formed to provide end flanges 85 to engage the outer surface of the sheet 70, the two end flanges being of different thicknesses as shown in Fig. 7 since one end flange engages the outer end portion of the sheet and the other end flange engages the inner underlying edge portion of the sheet. Preferably all of the pairs of sheet-engaging fingers 80 are manually controlled in unison to contract for the purpose of engaging a sheet and to expand for the purpose of placing the sheet under tension.

The pairs of sheet-engaging fingers 80 may comprise the outer ends of pairs of cooperating levers generally designated 86 and best shown in Fig. 7. Each lever 86 of a pair has a cylindrically curved surface 87 to slidingly engage a longitudinal pivot rod 88 for rotary movement about the axis of the rod. As best shown in Fig. 9, the rod 88 is mounted in the end walls 41 of the rotary drum and is formed with spaced circumferential grooves 89 to receive the pairs of levers 86. The inner ends of each pair of the levers 86 straddle a rocker shaft 90 which is cut away longitudinally to provide an extensive cam portion 91. As shown in Fig. 7 the cam portion 91 is relatively narrow along one cross-sectional dimension. A suitable spring 94 having hooked ends 95 interconnects the two levers 86 to draw the two levers together thereby holding the two levers in engagement with the pivot rod 88.

Figure 3:
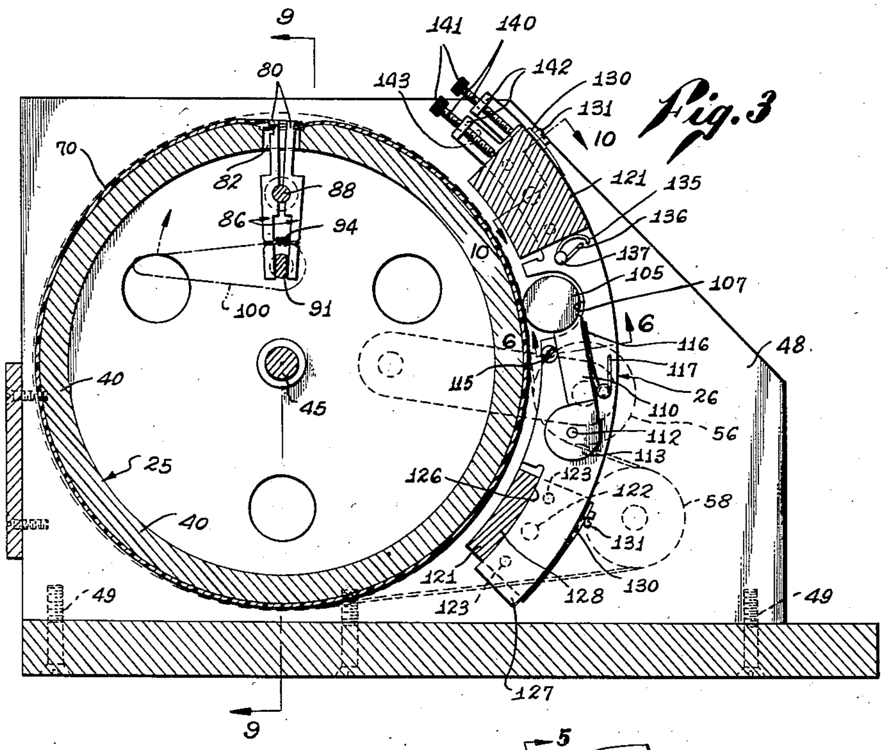
Fig. 3 is the transverse section on an enlarged scale taken as indicated by the broken line 3—3 of Fig. 2.

In the released position of the two levers 86 wherein the two fingers 80 are contracted together as shown in Fig. 7, the rocker shaft 90 is rotated to a position at which the cam portion 91 of the shaft spreads the lower portions of the two levers apart in opposition to the spring 94. When the rocker shaft 90 is rocked 90° as shown in Fig. 3 the cam portion 91 of the rocker shaft permits the spring 94 to draw the two levers 86 of each pair together at their lower ends thereby to spread the fingers 80 apart into yielding engagement with the two ends of the sheet 70 as heretofore described. The pivot rod 88 acts as a fulcrum for the two levers 86 and the tension of the spring 94 in urging the two sheet-engaging fingers 80 apart is transmitted to the sheet 70.

The rocker shaft 90 may be manually controlled in any suitable manner. In the construction shown, for example, the rocker shaft extends through one of the end walls 41 of the rotary drum 25 and is journaled in the two end walls for rocking action. A suitable actuating arm 100 is mounted on the outer end of the rocker shaft 90 by a suitable screw 101. The actuating arm 100 is relatively thin as shown in Fig. 9 for operation in the clearance space between the rotary drum 25 and the adjacent support plate 48 and serves as a convenient finger piece for moving the rocker shaft between its two positions.

Since the pairs of levers 86 together with the pivot rod 88 and the rocker shaft 90 tend to throw the rotary drum 25 off balance the end walls 41 of the rotary drum are preferably formed with thickened portions 102 (Fig. 9) to serve as counterweights to balance the drum.

*Mounting means for the magnetic heads*

Figure 4:
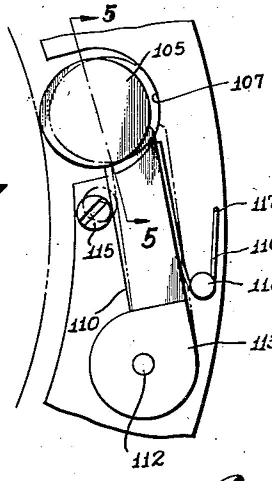
Fig. 4 is an enlarged detail of Fig. 3, showing how a magnetic head is mounted on a holder.

The preferred practice of the invention contemplates the employment of ring-type magnetic heads 105 which are specially designed for compactness in axial dimension. The magnetic heads 105 are closely spaced in a row across the periphery of the rotary drum 25, the row being aligned transversely or perpendicularly of the direction of travel of the recording sheet 70. While any suitable means may be provided for supporting the magnetic heads 105 in such a recording zone, the preferred practice of the invention is characterized by the use of holders 26 in the form of blade members as heretofore stated. As best shown in Fig. 4 the row of spaced blade-like holders 26 lie relatively close to the recording sheet 70 on the rotary drum 25 and the individual holders are of curved configuration. To provide space for the magnetic heads 105 the holders 26 are cut away at their inner edges to provide ample recesses 107 thus providing ample space for the row of magnetic heads 105.

Figure 6:
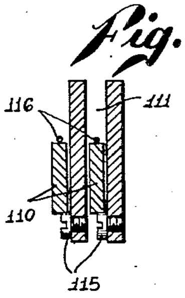
Fig. 6 is a fragmentary section taken as indicated by the line 6—6 of Fig. 3.
Figure 5:
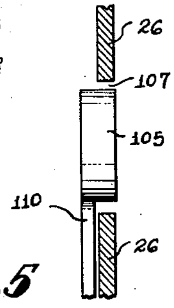
Fig. 5 is a fragmentary section taken as indicated by the line 5—5 of Fig. 4.

Preferably the magnetic heads 105 are supported from the corresponding holders 26 by suitable mounting means that permit individual adjustment of the heads with respect to the periphery of the recording sheet 70 on the rotary drum. As best shown in Figs. 4, 5 and 6, each magnetic head 105 is mounted for this purpose on a thin arm 110 that extends into a space 111 between two of the holders 26 and is pivotally mounted on one of the holders by a suitable pivot stud 112. In the region of the pivot stud 112 each of the mounting means or arms 110 is formed with an ample bearing portion 113 that is in intimate sliding contact with the face of the corresponding holder 26, the purpose of such construction being to hold the magnetic head 105 accurately to a predetermined arc of adjustment relative to the rotary drum. Between the bearing portion 113 and the corresponding magnetic head 105, the mounting arm 110 is preferably relatively thin.

Preferably adjustability of the magnetic head 105 with reference to the rotary drum is provided by an adjustment screw 115 in cooperation with a suitable wire spring 116. The wire spring 116 has one end 117 seated in a suitable small bore in the holder 26 for anchorage and is bent around a stud 118 on the holder to press against the mounting arm 110. The adjustment screw 115 has an eccentric head as may be seen in Fig. 6 so that rotation of the screw in abutment with the mounting arm 110 varies the pivotal position of the mounting arm. Preferably the adjustment screw 115 is rotated to a position to permit the magnetic head to contact the sheet 70 on the rotary drum 25 but not to permit the magnetic head to touch the peripheral surface of the drum in the absence of a sheet 70.

Preferably relative movement between each magnetic head 105 and the corresponding holder 26 is limited to the adjustment described and additional adjustment of each magnetic head with respect to the direction of travel of the recording sheet 70 is accomplished by bodily movement of the holder 26 that carries the head. For this purpose, each of the holders 26 is longitudinally movable in an arcuate path of adjustment concentric to the rotary drum 25. It is contemplated that each holder 26 will be slideably mounted in a suitable slot in a suitable support means with the slot serving as a guide channel for the longitudinal adjustment movement of the holder.

Figure 10:
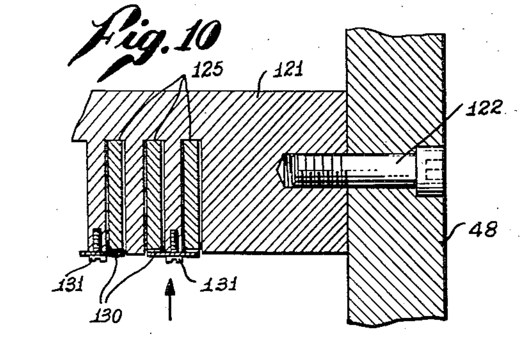
Fig. 10 is a fragmentary section taken as indicated by the broken line 10—10 of Fig. 3.
Figure 11:
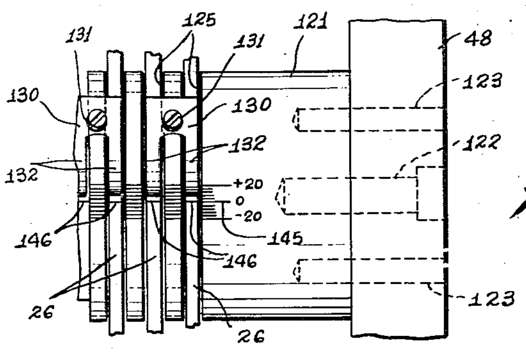
Fig. 11 is a fragmentary view taken as indicated by the arrow in Fig. 10, showing the index means for guidance in adjusting the magnetic heads.

In the present embodiment of the invention the blade-like holders 26 are supported by two spaced transverse support members 121, each of which extends between the two vertical support plates 48 and is fixedly attached thereto by a suitable screw 122 and a pair of dowels 123 as shown in Figs. 10 and 11. Each of the support members 121 has a row of openings or slots 125 each of which has an arcuate bottom surface 126 concentric to the rotary drum 25. Each of the holders 26 has an end portion 127 at each of its ends to slidingly extend into the slots 125 of the two support members 121. The two end portions 127 have arcuate edge surfaces 128 that are also of concentric curvature for sliding contact with the arcuate bottom surfaces of the slots 125. By virtue of this arrangement the various holders 26 may be slidingly adjusted longitudinally in the slots 125 of the two support members 121 and will be guided by the slots concentrically with respect to the rotary drum 25.

Any suitable means may be provided to slidingly retain the holders 26 in the slots 125 and to hold the holders individually at adjusted longitudinal positions in the slots. Preferably, the holders 26 are yieldingly pressed into sliding contact with the arcuate bottom surfaces of the slots and are yieldingly urged longitudinally against adjustable stops to fix their longitudinal positions.

The yielding means to retain the holders 26 in the slots in pressure contact with the arcuate bottom surfaces 126 of the slots may comprise suitable leaf springs 130 best shown in Figs. 10 and 11. Each of the leaf springs 130 is secured to one of the support members 121 by a suitable screw 131 and is formed with a pair of arms 132 each of which presses inward on one of the holders 26. As may be seen in Fig. 3 both of the support members 121 are provided with leaf springs 130 so that each of the holders 26 is pressed inward by a leaf spring arm 132 at each end of the holder.

The yielding means to urge each holder 26 in one longitudinal direction may comprise a suitable wire spring 135 having one end 136 inserted in the holder for anchorage, the wire spring being wrapped around a stud 137 on the holder in such manner as to press against the adjacent support member 121 and thereby tend to urge the holder longitudinally downward as viewed in Fig. 3.

The upper end of each holder 26 is provided with a suitable stop screw 140 which is in adjustable abutment with the upper support member 121, as shown in Fig. 3, to hold the holder at any desired longitudinal position in opposition to the pressure of the wire spring 135. Each screw 140 has a knurled head 141 for convenient manual rotation and is mounted in a flange 142 on the end of the holder, which flange overhangs the support member 121. In the construction shown, each flange 142 is provided by mounting an angular clip 143 on the end of the holder 26. A feature of the invention is the concept of positioning the angular clips 143 and the corresponding adjustment screws 140 in two rows with the successive screws staggered.

A suitable index means may be provided for guidance in manipulating the screws 140 for longitudinal adjustment of the individual holders 26. Such index means may be provided in any suitable manner and may be suitably calibrated. Fig. 11 shows, by way of example, an index arrangement that may be used to advantage for adjusting the holders 26 longitudinally to compensate for various distances of wave travel through the earth from a wave propagating point to various detectors corresponding to the channels of the apparatus.

The index arrangement includes a zero reference line 145 scribed on the upper support member 121 to intersect the row of slots 125. Each of the holders 26 is scribed with a corresponding reference line 146. When all of the adjustment screws 140 are manipulated to make all of the reference lines 146 on the various holders register with the zero reference line 145, all of the magnetic heads 105 are accurately positioned for synchronous recording of wave signals arriving simultaneously at detectors corresponding to the magnetic heads. Since the signal waves must travel various distances through the earth to reach the various detectors the signals do not arrive at the detectors simultaneously and therefore synchronous recording in the sense of geometrical simultaneity of the recorded signal components on the sheet 70 will require compensating longitudinal adjustment of the holders 26.

For guidance in such adjustment the zero reference line 145 on the support member 21 is part of a scale that extends in both directions from the zero reference line as may be seen in Fig. 11. The scale is calibrated in terms of milliseconds of recording time at the selected peripheral speed of the drum of 3½ inches per second. The range of adjustment may extend, as shown, from minus 20 milliseconds to plus 20 milliseconds.

*Operation of the apparatus*

The operation of the described multiple-channel magnetic recorder may be readily understood from the foregoing description. It is a simple matter to swing the actuating arm 100 to the position shown in Fig. 7 thereby to contract the two sheet-engaging fingers 80 in each of the drum slots 82. A recording sheet 70 is then wrapped around the drum and the overlapping slots 66 and 67 at the ends of the sheet are slipped over the ends of the contracted fingers 80. Throwing the actuating arm 100 from the position shown in Fig. 7 to the position shown in Fig. 3 rotates the cam 91 to permit the springs 94 of the various pairs of levers 86 to move the fingers 80 apart and this expanding action on the part of each pair of fingers 80 results in placing the sheet 70 in longitudinal tension at a plurality of spaced points across the rotary drum. In this manner the sheet 70 is stretched smooth against the peripheral surface of the rotary drum.

The various screws 140 are manipulated for longitudinal adjustment of the individual holders 26 to provide the desired phase synchronization of the multiple tracks on the recording sheet 70.

With the recording circuits for the various channels ready for recording operation, steps are taken for creating the desired seismic waves by detonation and the motor 50 is energized to rotate the drum 25. Energization of the motor 50 automatically energizes the solenoid 69 to lift the brakeshoe 62 from the periphery of the flywheel 65, thereby to permit free rotation of the rotary drum. At the end of the short recording period as the rotary drum approaches completion of one rotation, the motor 50 and the solenoid 69 are both deenergized whereupon the concealed spring in the magnetic brake 66 presses the brakeshoe 62 against the flywheel to stop the rotary drum.

It is usually desirable to switch the magnetic heads 105 immediately into reproducing circuits for reproduction of the recorded signals to make sure that proper recording has been accomplished. Once the recording has been checked in this manner the sheet 70 may be removed from the drum and filed for further study.

The complete record sheet may be filed in the convenient and compact manner of a sheet of paper and provides a permanent record not subject to deterioration nor vulnerable to damage in the course of ordinary handling. It is especially advantageous that the recording of the multiple signals is reproducible immediately at the end of the recording period. If desirde, the recorded signals may be analyzed on the spot and to this end the signals may be fed to a suitable electronic analyzer and electronic filers may be employed for selective study of significant components of the signals.

It is apparent that the apparatus may be initially equipped for recording of only a few simultaneous signals and at any time may be quickly expanded to handle a larger number of signals. This flexibility with respect to the number of active channels resides in the fact that the amplifier units 35 as well as the individual holders 26 for the magnetic heads 105 are readily mountable and demountable. It is a simple matter to place an amplifier unit 35 in a drawer 34 and to plug in the unit by means of the releasable connectors 36. It is also a simple matter to slip a holder 26 or a magnetic head 105 into the slots 125 of the two support members 121 and to secure the added holder by adding the required leaf springs 130.

With the same ease either an amplifier unit 35 or a holder 26 may be replaced whenever necessary. The two adjustment screws 115 and 140 carried by each holder 26 makes it possible to adjust each magnetic head 105 in a convenient manner both with respect to the position of the head for proper contact with the recording sheet 70 and with respect to the position of the magnetic head longitudinally of the direction of travel of the recording sheet.

The compactness of the structure to obtain as many as 44 record tracks on a single recording sheet less than 12 inches wide is made possible by the use of the relatively thin blade-like holders 26 in conjunction with the relatively thin magnetic heads 105 and the relatively thin mounting means 110 for each head. In the initial embodiment of the invention each of the holders 26 is on the order of ⅛ inch wide and the space 111 (Fgi. 6) between two adjacent holders is also on the order of ⅛ inch wide. The thickness or axial dimension of a magnetic head 105 is in proportion to the combined dimension of the holder 26 and a space 111 adjacent the holder. Thus, as may be seen in Fig. 5, with holders 26 on the order of ⅛ inch thick and spaced apart approximately ⅛ inch, the magnetic heads 105 may be slightly less than ¼ inch in thickness. Thus the arrangement permits making four record tracks per inch across the width of the recording sheet 70.

My description in specific detail of a preferred practice of the invention will suggest to those skilled in the art various changes, substitutions and other departures from my illustrative disclosure that properly lie within the spirit and scope of the appended claims.

Having described my invention, I claim:

1. A multiple-channel magnetic recorder having: means to move a recording medium in the form of a relatively wide sheet longitudinally in a path through a recording zone; a plurality of magnetic heads at said recording zone spaced close together in a simple compact row extending transversely of said path across the width of said sheet; a corresponding plurality of holders disclosed side by side in a similar row adjacent said zone, said holders being substantially thinner than said heads to provide substantial spaces between said holders, each of said heads being thinner than the combined thickness of holders and the adjacent space between two holders; and a corresponding plurality of mounting means for supporting said heads from said holders, respectively, said last named means extending into said spaces between said holders.

2. A combination as set forth in claim 1 in which each of said last named means is pivotally connected to the side of the corresponding holder in the space between two holders and is adjustable about its pivot for adjustment of the corresponding magnetic head relative to said path.

3. In a multiple-channel magnetic recorder, the combination of: means to move a recording medium in the form of a relatively wide sheet longitudinally in a path through a recording zone; a plurality of spaced blades arranged in a single row across said path in the region of said zone; fixed support means to hold said blades in position; a corresponding plurality of closely spaced magnetic heads arranged in a similar row at said zone, each head having a thickness greater than the thickness of said blades but less than the thickness of a blade plus the spacing between the blades; and a corresponding plurality of means extending from said magnetic heads respectively into the spaces between said blades to support the magnetic heads from the blades.

4. In a multiple-track magnetic recorder, the combination of: means to move a recording medium in the form of a relatively wide sheet longitudinally in a circularly curved path through a recording zone for recording multiple closely spaced longitudinal tracks on the medium; support means adjacent said path and extending transversely of the path, said support means having a plurality of openings corresponding to said tracks respectively; a plurality of holders for said heads positioned in said openings respectively, surfaces of the holders in contact with the walls of the openings being concentric to said path for longitudinal movement of the holders concentric to the path; means to releasably retain each of said holders in the corresponding opening; and a plurality of relatively thin magnetic heads corresponding to said tracks and carried by said holders respectively.

5. A combination as set forth in claim 4 in which said openings are slots and said holders are blade-like members seated edgewise in the slots.

6. A combination as set forth in claim 4 in which said support means comprises two supports spaced apart along said path to carry opposite ends of said holders.

7. In a multiple track magnetic recorder, the combination of: means to move a recording medium in the form of a relatively wide sheet longitudinally in a circularly curved path through a recording zone for recording multiple closely spaced longitudinal tracks on the medium; support means adjacent said path and extending transversely of the path, said support means having a plurality of openings corresponding to said tracks respectively; a plurality of holders for said heads positioned in said openings respectively, the surfaces of the holders in contact with the openings being concentric to said path for movement of the holders concentric to the path, said holders being slideable in said openings; adjustable means to fix the longitudinal position of each of said holders individually in said openings; means to releasably retain said holders in the openings, and a plurality of relatively thin magnetic heads corresponding to said tracks and carried by said holders respectively.

8. A combination as set forth in claim 7 which includes index means for guidance in adjusting each of said holders longitudinally relative to said support means for adjustment of the individual magnetic heads longitudinally of said path.

9. A combination as set forth in claim 8 in which said index means is calibrated for guidance in adjusting said holders for synchronous recording of seismic waves traveling different distances through the earth from a source.

10. In a multiple-track magnetic recorder, the combination of: means to move a recording medium in the form of a relatively wide sheet longitudinally in a circularly curved path through a recording zone for recording multiple closely spaced longitudinal tracks on the medium; two support means adjacent said path and extending transversely of the path, said two support means being spaced apart longitudinally of the path on opposite sides of said zone, said two support means having pluralities of aligned openings corresponding to said multiple tracks respectively; a plurality of spaced holders spanning the space between said support means with the opposite ends of the holders releasably mounted in said openings; a corresponding plurality of closely spaced magnetic heads arranged in a single row in said zone between said holders and said path, each of said heads being thicker than the corresponding holder but thinner than the combined thickness of a holder and the space between two holders; and means to support each of said magnetic heads from the corresponding holder.

11. A combination as set forth in claim 10 in which said holders are positioned close to said path and are recessed on their inner sides to provide space for said row of heads.

12. A combination as set forth in claim 10 which includes screw means to adjust each of said heads relative to the corresponding holder thereby to adjust the head relative to said path.

13. A combination as set forth in claim 10 which includes means to adjust each of said holders individually longitudinally relative to said two support means.

14. In a multiple-track magnetic recorder the combination of: means to move a recording medium in the form of a sheet longitudinally in a circularly curved path through a recording zone for recording multiple closely spaced longitudinal tracks on the medium; two support means adjacent said path and extending transversely of the path, said two support means being spaced apart longitudinally of the path on opposite sides of said zone, said two support means having pluralities of aligned slots corresponding to said multiple tracks respectively; a plurality of spaced holders spanning the space between said support means with the opposite ends of the holders slidably extending into said slots, the bottom surfaces of the ends of the holders being in contact with the bottoms of the slots and being curved concentric to said path; a corresponding plurality of closely spaced magnetic heads arranged in a row in said zone, said heads being supported by said holders respectively; and means to fix the positions of said holders longitudinally of said slots.

15. A combination as set forth in claim 14 which includes yielding means urging said holders towards the bottoms of said slots.

16. A combination as set forth in claim 14 in which yielding means acting in stress between each of said holders and one of said support means urges said holder in one longitudinal direction and stop means on each holder limits the movement of the holder in response to the yielding means thereby to fix the longitudinal position of the holder.

17. A combination as set forth in claim 16 in which each of said stop means is adjustable for adjustment of the corresponding magnetic head longitudinally of said path.

18. A combination as set forth in claim 17 in which one of said support means and said holders are provided with index means for guidance in adjustment of said stop means.

19. In a multiple-track magnetic recorder, the combination of: means to move a recording medium in the form of a relatively wide sheet longitudinally in a circularly curved path through a recording zone for recording multiple closely spaced longitudinal tracks on the medium; two support means adjacent said path and extending transversely of the path, said two support means being spaced apart longitudinally of the path on opposite sides of said zone, said two support means having pluralities of aligned slots corresponding to said multiple tracks respectively; a plurality of spaced holders spanning the space between said support means with the opposite ends of the holders slideably mounted in said slots for longitudinal adjustment therein, the outer ends of said holders extending beyond one of said support means; yielding means acting between each holder and one of said support means to urge the holder in the longitudinal direction to withdraw its extended outer end; an adjustment screw carried by each of said outer ends for engagement with the adjacent supporting means to limit such longitudinal withdrawing movement thereby to adjustably fix the longitudinal position of the holder, said screws being staggered in a plurality of rows; a corresponding plurality of closely spaced magnetic heads arranged in a row in said zone between said holders and said path; and means to support each of said heads from the corresponding holder.

20. A combination as set forth in claim 19 in which said holders and one of said support means are indexed for guidance in the screw adjustment of the holders.

References Cited in the file of this patent

UNITED STATES PATENTS

| | | |
|---|---|---|
| 2,468,224 | Munsen | Apr. 26, 1949 |
| 2,505,300 | Nace | Apr. 25, 1950 |
| 2,513,409 | Grafstein | July 4, 1950 |
| 2,519,725 | White | Aug. 22, 1950 |
| 2,607,654 | Ridings | Aug. 19, 1952 |
| 2,615,780 | Cooley | Oct. 28, 1952 |
| 2,644,856 | Pettus | July 7, 1953 |
| 2,698,359 | Roberts | Dec. 28, 1953 |
| 2,668,879 | D'Arcy | Feb. 9, 1954 |
| 2,679,551 | Newby | May 25, 1954 |
| 2,680,785 | Franklin | June 8, 1954 |
| 2,685,492 | Gabriel | Aug. 3, 1954 |